United States Patent [19]

Dalstein

[11] Patent Number: 5,726,847
[45] Date of Patent: Mar. 10, 1998

[54] METHOD OF GENERATING A PROTECTION-TRIGGERING SIGNAL

[75] Inventor: Thomas Dalstein, Berlin, Germany

[73] Assignee: Siemens Aktiengesellschaft, München, Germany

[21] Appl. No.: 619,652

[22] PCT Filed: Sep. 20, 1994

[86] PCT No.: PCT/DE94/01149

§ 371 Date: May 24, 1996

§ 102(e) Date: May 24, 1996

[87] PCT Pub. No.: WO95/09469

PCT Pub. Date: Apr. 6, 1995

[30] Foreign Application Priority Data

Sep. 27, 1993 [DE] Germany .................. 43 33 260.9

[51] Int. Cl.$^6$ ............................................. H02H 3/00
[52] U.S. Cl. ........................... 361/93; 361/86; 361/87
[58] Field of Search .................. 364/481–483; 395/21–23, 27, 50, 54, 75, 77, 906, 907, 915; 361/91–94.96, 79, 86, 87

[56] References Cited

U.S. PATENT DOCUMENTS 5,159,660 10/1992 Lu et al. ................................. 395/22
5,537,327 7/1996 Snow et al. ............................ 364/483

OTHER PUBLICATIONS

G. W. Swift, *Detection of High Impedance Arching Faults Using a Multi-Layer Perceptron*, IEEE, Oct. 7, 1992, pp.1871–1877.

Böhme et al., *Optimierung von Distanzchutz-algorithmen mit Hilfe neuronaler Netze*, Eledtrie, 1993, pp. 2–10, No Month.

Schöneburg et al., *Neuronale Netzwerke*, Einführung, 1991, pp. 26–29, 75–76 and 108–109, No Month.

Ungard et al., *Schutztechnik in Elektroenergiesystemen*, Vorwort, 1991, pp. 116–117, No Month.

Müller et al., *Selektivischutz elektrischer Anlagen*, Aug. 2, 1990, pp. 122–124.

*Primary Examiner*—Ronald W. Leja
*Attorney, Agent, or Firm*—Kenyon & Kenyon

[57] ABSTRACT

A method of generating a protection-triggering signal using a triggering device of a selective-protective arrangement for an electrical power network to be monitored. In order to produce a protection-triggering signal in a relatively short time after the occurrence of a fault in the power network, a triggering device is provided in which a neural network is associated with each phase conductor in the power network. Successively sampled normalized values of the current in the power network are applied at the same time to the various neurons in the input layer of each neural network and a subsequently sampled normalized value (comparison value) of the current compared with the signal from the output neuron. If the normalized comparison value exceeds the output from the output neuron, a protection-triggering signal is generated.

23 Claims, 2 Drawing Sheets

METHOD OF GENERATING A PROTECTION-TRIGGERING SIGNAL

FIELD OF THE INVENTION

The present invention relates to a method for generating a protection-triggering signal using a triggering device of a selective-protective arrangement for an electrical power network.

BACKGROUND INFORMATION

It is known to use selective-protective arrangements for detecting disruptions in electrical power networks in order to be able to selectively switch off the components or network parts of an electrical power network which are affected by the disruption. Such selective-protective arrangements generally do not initiate their activity until protection-triggering signals have been generated using triggering devices. For example, it can be understood from the book by L. M üller/E. Boog "Selektivschutz elektrischer Anlagen" (Selective protection of electrical systems), 2nd edition, 1990, pp. 122–124 as well as from the book by H. Ungrad, W. Winkler and A. Wiszniewski "Schutztechnik in Elektroenergiesystemen" (Protection technology in electrical power systems), 1991, pp. 114 and 116 that triggering devices responding to overcurrents have overcurrent relays in the phase conductors, which in the classic design actually also have relays as components but which represent purely electronic arrangements in modern technology. With the known overcurrent relays, it is checked whether the peak value of the current or the effective (rms) value lies above a specified allowable current value. If this is the case, then a protection-triggering signal is output.

SUMMARY OF THE INVENTION

The present invention provides a method for generating a protection-triggering signal using a triggering device of a selective-protective arrangement for an electrical power network to be monitored in which the protection-triggering signal is generated for values of the currents in the phase conductors of the power network lying above allowable values (overcurrents).

The present invention further provides a method wherein a protection-triggering signal can be generated with the method in a relatively short time upon occurrence of an overcurrent.

In accordance with the present invention, a triggering device is provided in which a neural network, having an input layer, an intermediate layer, and an output layer having an output neuron, is associated with each phase conductor of a power network to be monitored. Each neural network is trained by simulating the currents for different load states of the power network to be monitored.

Successively sampled normalized values of the current in the respective associated phase conductor of the power network are applied at the same time to the different neurons of the input layer of each neural network in order to form an output signal of the output neuron corresponding to the predictable curve of the current. A subsequently sampled normalized value of the current in the respective associated phase conductor is compared with the output signal of the output neuron and thus with the predictable curve of the current. The protection-triggering signal is generated if the normalized comparison value of the current in the respective associated phase conductor exceeds the output signal of the output neuron of the corresponding neural network.

The essential advantage of the method according to the present invention is that a protection-triggering signal is generated with the method a relatively short time after the occurrence of an overcurrent. This can be attributed to the fact that in the carrying out of the method according to the invention, the progression vs. time of the respective current does not have to be monitored until the current in the respective phase conductor has exceeded a value characterizing an overcurrent. Instead, due to the use of trained neural networks, the possibility exists, based on the curve of the sampled current values which is predictable with the neural network, an overcurrent can be detected if, for example, shortly after a zero crossing of the current, the current curve has a curve which is characteristic of an overcurrent. It is thus possible to detect an overcurrent as a result of detecting a significant deviation of a single sampled current value from a current value characterizing a normal load current and to generate a protection-triggering signal. Naturally, the method according to the present invention also includes the possibility to wait multiple sampling steps for safety reasons and not to output a protection-triggering signal until the decision that an overcurrent case exists is substantiated through the evaluation of current values recorded through further samples.

Although "IEEE Transactions on Power Delivery", Vol. 7, No. 4, October 1992, pp. 1871–1876 describes the application of current sampled values over multiple seconds to a trained three-layer perceptron on the input side in order to obtain an output signal characterizing a high-impedance fault, it is a question there of creating a reliable personal protection system, dry or moist earth also being taking into account. The output signal assumes only the values "0" or "1" A comparison of the output signal with an additional current sampled value as a comparison value is not performed.

Moreover, from an article by K. Böhme and B. Kulicke entitled "Optimierung von Distanzschutzalgorithmen mit Hilfe neuronaler Netze" (Optimization of distance-protection algorithms with the aid of neural networks) in the journal "Elektrie" (Electricity) 47 (1993) 1, pp. 2–10, it can be understood that a distance-protection arrangement can be implemented using a suitably trained neural network. The learning data is created using a simulation technique in that power network lines of different lengths and different fault cases are simulated. This article does not contain any indication of a triggering device based on a neural network for a selective-protective arrangement as well as of the formation of a protection-triggering signal using a comparison of the output signal of the output neuron of the neural network with a sampled value of a measurable quantity acquired from the power network to be monitored.

Moreover, from the above-mentioned book by Müller/Boog on pp. 124–127 and from the book by H. Ungrad et al. on pp. 116–121, it can be understood that a triggering of selective-protective arrangements can be carried out not only by detecting overcurrents by also by detecting underimpedances. Such a triggering is chosen particularly when the smallest possible short-circuit current is smaller than the greatest possible operating current.

In order to also obtain within the framework of underimpedance triggering a protection-triggering signal as fast as possible, an extended triggering device is used in an advantageous enhanced embodiment of the method according to the present invention. In this embodiment, a further neural network having, an input layer, an intermediate layer and an output layer having an output neuron, is associated with each phase conductor of the power network to be monitored. Each further neural network is trained through simulation of the voltages for different load states of the power network to be monitored. Successively sampled normalized values of the voltage on the respective associated phase conductor of the power network are applied at the same time to the different neurons of the input layer of each further neural network. A subsequently sampled normalized value of the voltage on the respective associated phase conductor is compared with the output signal of the output neuron of the respective further neural network corresponding to the predictable curve of the voltage. The protection-triggering signal is generated if the normalized comparison value of the current in the respective associated phase conductor exceeds the output signal of the output neuron of the corresponding neural network and/or additionally the normalized comparison value of the voltage on respectively the same phase conductor falls below the output signal of the output neuron of the corresponding further neural network.

This specific embodiment of the method according to the present invention is likewise characterized in that the corresponding protection-triggering signal is generated with the method a relatively short time after the occurrence of an underimpedance, since, through the use of correspondingly taught further neural networks, the voltage curves in the case of a short-circuit are also correspondingly predictable so that a protection-triggering signal is made available already within fractions of a period of the line voltage.

Moreover, it is advantageous if, after the generation of the protection-triggering signal, the output signal of the output neuron of the respective neural network is taken as the next sampled value and is connected simultaneously with existing sampled normalized values of the current to the same neural network.

Moreover, it is seen as advantageous with regard to a specified reliability of the method according to the invention for a relatively simple design of the neural networks if neural networks having an input layer with five neurons and having an intermediate layer with five neurons are used.

Moreover, the method according to the invention makes it possible in an advantageous manner to make available reference currents or rather reference voltages for the associated selective-protective arrangement if the output signal of the output neuron is used as a reference signal for the selective-protective arrangement. Particularly if a directional relay is used as the selective-protective arrangement, this specific embodiment of the method according to the invention is particularly advantageous.

DETAILED DESCRIPTION

Figure 1:
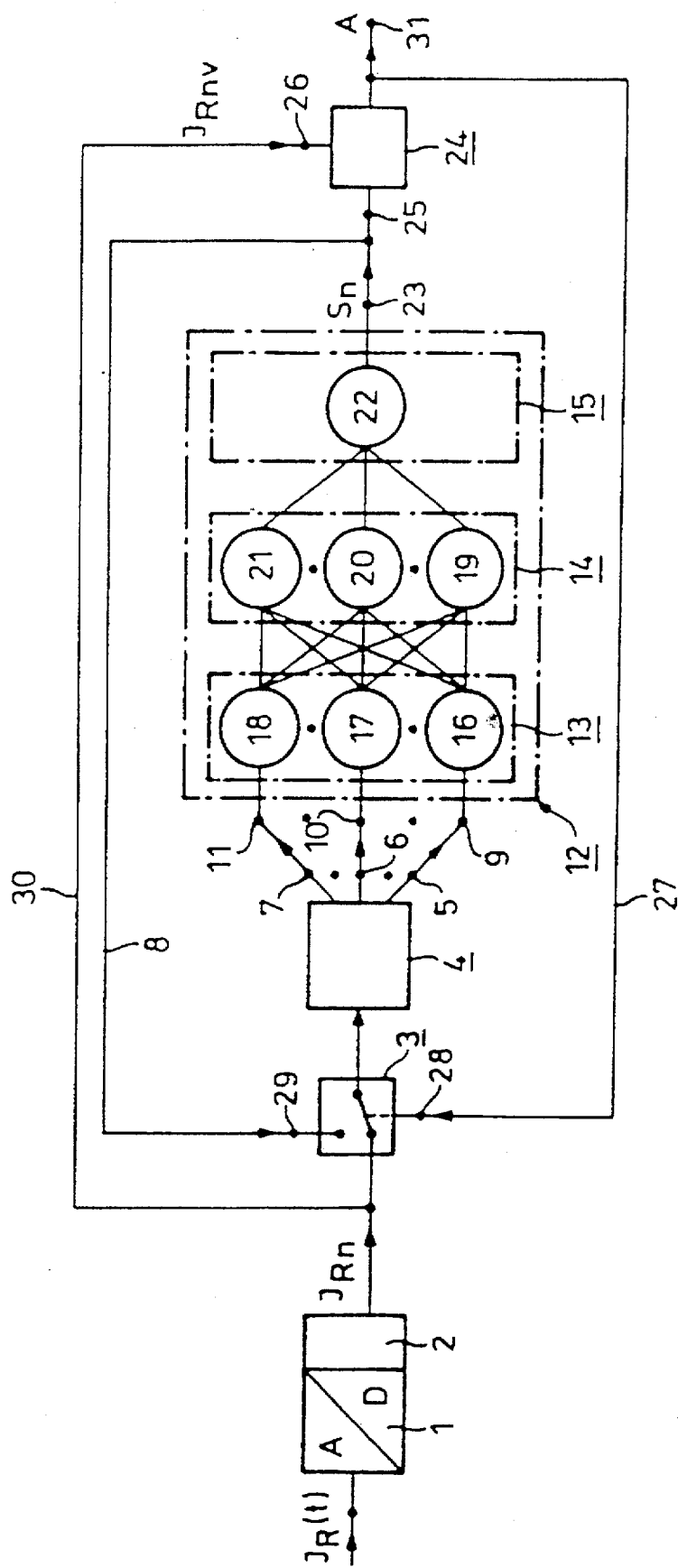
FIG. 1 illustrates an exemplary embodiment of an arrangement having a neural network for generating a protection-triggering signal due to an overcurrent in a phase conductor.

The arrangement shown in FIG. 1 has fed to it on the input side a current $J_R(t)$ which is proportional to the current in the phase conductor R of a power network, not shown, to be monitored. The current $J_R(t)$ is sampled in an analog/digital converter 1; the sampled current values are converted into digital values. In a normalizing module 2 arranged afterwards, the sampled current values are converted into normalized values $J_{Rn}$ of the current. The sampled, normalized values $J_{Rn}$ are fed via an electronic changeover switch 3 to a multiplexer 4 having five outputs, of which the outputs 5, 6 and 7 are shown. The multiplexer 4 is equipped with delay elements of the type such that, at its outputs 5 to 7, the sampled values $J_{Rn}$ of the current appear simultaneously, the simultaneous appearance of the differently delayed values at the outputs 5 to 7 taking place simultaneously with the transmission of a further sampled value $J_{Rn}$ from the normalizing module 2 via a line 30.

Five inputs 9, 10 and 11 (only three inputs are shown) of a neural network 12 are connected to the outputs 5 to 7 of the multiplexer 4. The neural network 12 includes an input layer 13, an intermediate layer 14 and an output layer 15. The neural network 12 has in its input layer 13 five neurons, of which three neurons 16, 17 and 18 are shown; the intermediate layer 14 likewise has five neurons, of which three neurons 19, 20 and 21 are shown, whereas the output layer 15 is provided only with a single neuron (output neuron 22). In the present case, the neural network 12 is trained in accordance with the back-propagation algorithm by Rumelhart, the currents $J_R(t)$ for the different load and fault states being generated through simulation with a network model corresponding to the power network to be monitored. In the present case, the network model NETOMAC was used, which is described in detail in "Elektrizitätswirtschaft" [Electricity business], 1979, Issue 1, pp. 18–23.

A comparator 24 is arranged after one output 23 of the output layer 15 or rather the neural network 12, the comparator 24 having the output signal of the output neuron 22 applied to its one input 25. To a further input 26 of the comparator 24, the output of the normalizing module 2 is connected directly via the line 30 so that a sampled, normalized value $J_{Rnv}$, used as a comparison value for the current $J_R(t)$, is fed to the comparator 24 via the input 26, which value follows in time the last sampled, normalized value fed to the multiplexer 4.

As can also be seen from FIG. 1, the output of the comparator 24 is connected via a control line 27 also to a control input 28 of the electronic switch 3; the signal input 29 of the switch 3 is connected to the output neuron 22 via a signal line 8.

The arrangement shown in FIG. 1 operates in a manner such that the current $J_R(t)$ is sampled in the analog/digital converter 1 and the sampled values are converted to digital values. They are normalized in the normalizing module 2 arranged afterwards and transmitted as sampled, normalized values $J_{Rn}$ via the enabled switch 3 to the multiplexer 4. This multiplexer 4 transmits based on the internal delay elements the values $J_{Rn}$ of the current $J_R(t)$, which are sampled one after another and normalized, via its outputs 5 to 7 and the inputs 9 to 11, simultaneously to the neural network 12, which then generates a corresponding normalized output signal $S_n$ at its output 23. The further sampled, normalized value of the current which is generated after the five sampled, normalized values of the current $J_R(t)$ is likewise transmitted simultaneously as the comparison value $J_{Rnv}$ via the output of the normalizing module 2 and the line 8 to the comparator 24 in which the comparison value $J_{Rnv}$ is compared with the output signal $S_n$ of the neural network 12. If the normalized comparison value $J_{Rnv}$ exceeds the output signal $S_n$ of the neural network 12, then a protection-triggering signal A is generated at the output 31 of the comparator 24.

Frequently, not only the current in a phase conductor is monitored, but the currents in the further phase conductors of the power network to be monitored are also checked. One arrangement corresponding to that shown in FIG. 1 is used in each case, so that corresponding protection-triggering signals are formed possibly at the outputs of these further arrangements. To generate a general trigger, these protection-triggering signals can be evaluated using OR elements. The output signal of the general trigger then represents a protection-triggering signal for the associated selective-protective arrangement, which can be a distance-protection arrangement, for example.

If a protection-triggering signal A is generated at the output 31, then the electronic switch 3 is switched over via the control line 27 and the output 23 or rather the output signal $S_n$ of the output neuron 22 is thus switched to the input of the multiplexer 4. This switches the signal $S_n$ and two more of the three values sampled earlier to the neural network 12. This procedure is repeated twice, until finally, only output signals $S_n$ (generated one after another) are processed by the multiplexer 4 and transmitted onwards. This is of interest, for example, in determining the direction of the fault in the power network.

Figure 2:
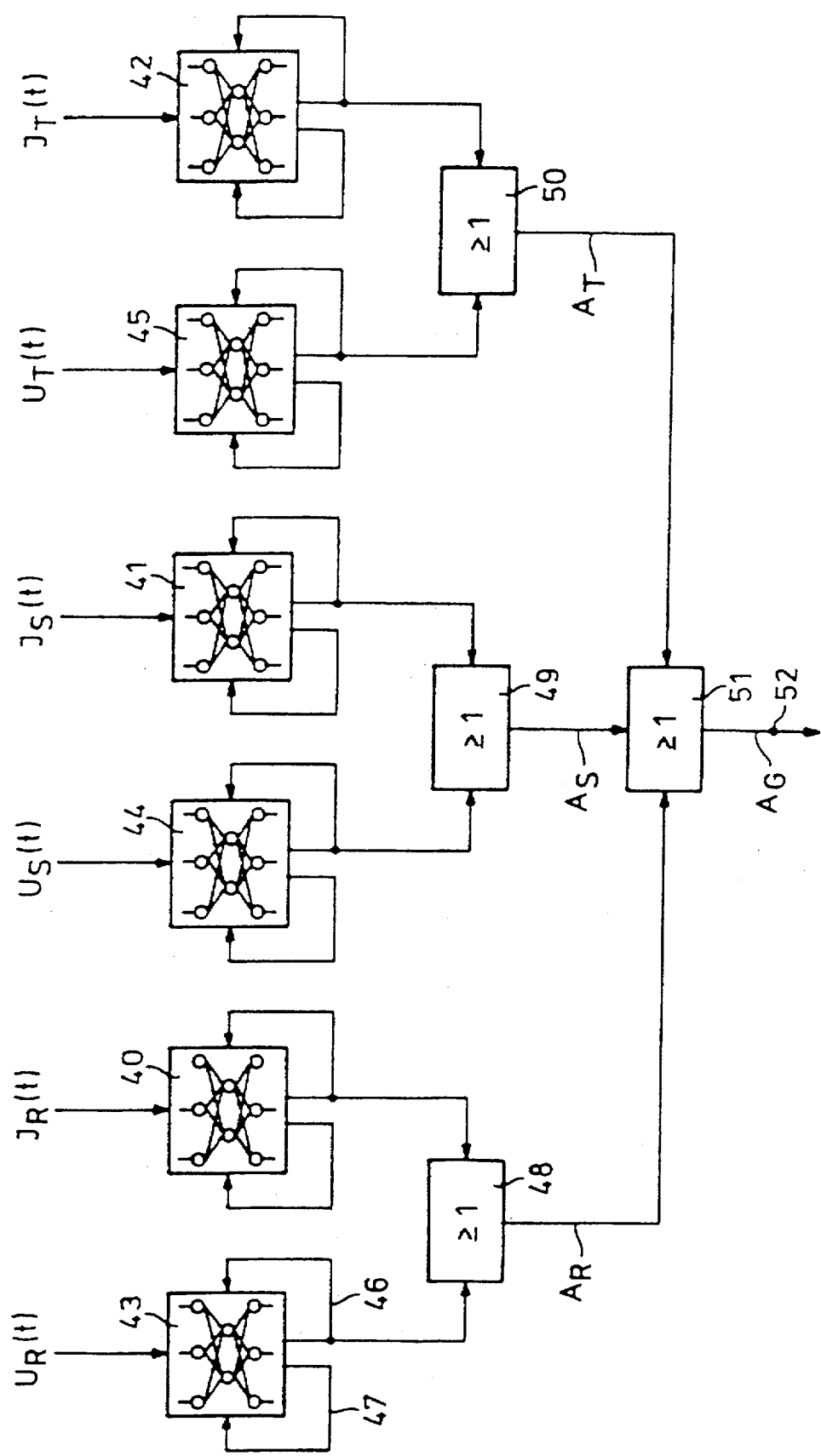
FIG. 2 is a block diagram of an arrangement with which a protection-triggering signal due to underimpedance triggering can be generated using neural networks.

In FIG. 2, a triggering device is shown in which not only currents $J_R(t)$, $J_S(t)$ and $J_T(t)$ are monitored using arrangements 40, 41 and 42 according to FIG. 1, but also the phase voltages $U_R(t)$, $U_S(t)$ and $U_T(t)$ using further arrangements 43, 44 and 45. Each of the arrangements 43 to 45 is designed corresponding to the arrangement according to FIG. 1 with the difference that they have the corresponding phase voltage applied to them and in each case have a further neural network, which in each case has been taught coachedly corresponding to the voltage conditions for different load states in a manner similar to that of the neural network 12 according to FIG. 1.

Like the arrangements 40, 41 and 42, the arrangements 43 to 45 are also provided in each case with a control line 46 and a signal line 47 corresponding to the lines 29 and 30 according to FIG. 1.

In each case, an OR element 48, 49 and 50 is arranged after the arrangements 40 and 43 or rather 41 and 44 as well as 42 and 45 associated with one another for each phase of the power network to be monitored, in which OR elements in the case of an underimpedance triggering, respectively a protection-triggering signal $A_R$, $A_S$ and/or $A_T$ is then generated if, for example, the voltage $U_R(t)$ falls below a specified value and/or the current $J_R(t)$ exceeds a highest allowable current. All OR elements 48 to 50 are connected to an OR element 51 arranged afterwards, which generates a general protection trigger $A_G$ at its output 52.

I claim:

1. A method for generating a protection-triggering signal using a triggering device of a selective-protective arrangement for an electrical power network to be monitored, the electrical power network having at least one phase conductor, and the triggering device including at least one first neural network, the method comprising the steps of:

sampling initial current values;

associating the at least one phase conductor with the at least one first neural network, the at least one first neural network including a first input layer, a first intermediate layer, and a first output layer and being trained by simulating currents for different load states of the power network, the first input layer comprising a first plurality of input neurons;

sampling a subsequent current value in the at least one phase conductor after the initial current values are sampled;

simultaneously applying the initial sampled current values to at least two of the first plurality of input neurons, the at least one neural network providing a first output signal at the first output layer in response thereto;

scaling the subsequent current value to form a comparison current value in the at least one phase conductor;

comparing the comparison current value to the first output signal; and generating the protection-triggering signal if the comparison current value exceeds a signal value of the first output signal.

2. The method of claim 1, wherein the triggering device further comprises at least one second neural network, the method further comprising the steps of:

sampling initial voltage values;

associating the at least one phase conductor with said second neural network, said second neural network including a second input layer, a second intermediate layer and a second output layer, and being trained by simulating voltages for different load states of the power network, the second input layer comprising a second plurality of input neurons;

sampling a subsequent voltage value in the at least one phase conductor after the initial voltage values are sampled;

simultaneously applying the sampled initial voltage values to at least two of the second plurality of input neurons, the at least one second neural network providing a second output signal at the second output layer in response thereto;

scaling the subsequent voltage value to form a comparison voltage value in the at least one phase conductor comparing the comparison voltage value to the second output signal; and generating the protection-triggering signal if the comparison voltage value is less than the second output signal.

3. The method of claim 2, further comprising the step of: applying the second output signal to at least one of the second plurality of input neurons.

4. The method of claim 3, wherein the second output signal is utilized as a reference signal for the selective-protective arrangement.

5. The method of claim 2, wherein the second input layer comprises five input neurons and the second intermediate layer comprises five intermediate neurons.

6. The method of claim 1, further comprising the step of: applying said first output signal to at least one of the first plurality of input neurons.

7. The method of claim 6, wherein the first output signal is utilized as a reference signal for the selective-protective arrangement.

8. The method of claim 1, wherein the first input layer comprises five input neurons and the first intermediate layer comprises five intermediate neurons.

9. The method of claim 1, wherein the comparison current value is compared to the first output signal in a comparator device.

10. A method for detecting an overcurrent in a phase conductor comprising the steps of:

successively sampling a current in the phase conductor to obtain a plurality of successive current values;

simultaneously applying each of the plurality of successive current values to respective inputs of a neural network having a plurality of inputs, the neural network providing an output value at an output in response thereto;

sampling the current in the phase conductor to obtain a comparison current value, the comparison current value sampled subsequently to obtaining the plurality of successive current values;

comparing the comparison current value to the output value at the neural network output; and generating a protection-triggering signal if said comparison current value deviates from the output value in a predetermined manner.

11. The method of claim 10, further comprising the step of:

applying the output value to one of the plurality of inputs of the neural network.

12. The method of claim 10, further comprising the step of:

training the neural network in accordance with a back-propagation algorithm.

13. The method of claim 10, further comprising the steps of:

normalizing each of the plurality of successive current values prior to simultaneously applying each of the plurality of successive current values to the respective inputs of the neural network; and normalizing the comparison current value prior to comparing the comparison current value to the output value.

14. The method of claim 10, wherein the generating step further comprises the step of:

generating the protection-triggering signal if the comparison current value is greater than the output value.

15. The method of claim 10, further comprising the steps of:

successively sampling a second current in a second phase conductor to obtain a second plurality of successive current values;

simultaneously applying each of the second plurality of successive current values to respective inputs of a second neural network having a plurality of inputs, the second neural network providing a second output value at an output in response thereto;

sampling the second current in the second phase conductor to obtain a second comparison current value, the second comparison current value sampled subsequently to obtaining the second plurality of successive current values;

comparing the second comparison current value to the second output value at the second neural network output;

generating a second protection-triggering signal if the second comparison current value deviates from the output value in a predetermined manner;

generating a third protection-triggering signal if at least one of the protection-triggering and the second protection-triggering signal is generated.

16. The method of claim 10, further comprising the steps of:

successively sampling a voltage in the phase conductor to obtain a plurality of successive voltage values;

simultaneously applying each of the plurality of successive voltage values to respective inputs of a second neural network having a plurality of inputs, the second neural network providing a second output value at a second output in response thereto;

sampling the voltage in the phase conductor to obtain a comparison voltage value, the comparison voltage value sampled subsequently to obtaining the plurality of successive voltage values;

comparing the comparison voltage value to the second output value at the second neural network output;

generating a second protection-triggering signal if the comparison voltage value deviates from the second output value in a predetermined manner;

generating a third protection-triggering signal if at least one of the protection-triggering and said second protection-triggering signal is generated.

17. The method of claim 10, wherein the comparison current value is compared to the output value in a comparator device.

18. A method for detecting an underimpedance in a phase conductor comprising the steps of:

successively sampling a voltage in the phase conductor to obtain a plurality of successive voltage values;

simultaneously applying each of the plurality of successive voltage values to respective inputs of a neural network having a plurality of inputs, the neural network providing an output value at an output in response thereto;

sampling the voltage in the phase conductor to obtain a comparison voltage value, the comparison voltage value sampled subsequently to obtaining the plurality of successive voltage values;

comparing the comparison voltage value to the output value at the neural network output; and generating a protection-triggering signal if the comparison voltage value deviates from the output value in a predetermined manner.

19. The method of claim 18, further comprising the step of:

applying the output value to one of the plurality of inputs of the neural network.

20. The method of claim 18, further comprising the step of:

training the neural network in accordance with a back-propagation algorithm.

21. The method of claim 18, further comprising the steps of:

normalizing each of the plurality of successive voltage values prior to simultaneously applying each of the plurality of successive voltage values to the respective inputs of the neural network; and normalizing the comparison voltage value prior to comparing said comparison voltage value to the output value.

22. The method of claim 18, wherein the generating step further comprises the step of:

generating the protection-triggering signal if the comparison voltage value is less than the output value.

23. The method of claim 18, wherein the comparison voltage value is compared to the output value in a comparator device.

* * * * *